United States Patent
Wey et al.

(10) Patent No.: US 9,734,557 B2
(45) Date of Patent: Aug. 15, 2017

(54) METHOD AND APPARATUS FOR GENERATING 3K-RESOLUTION DISPLAY IMAGE FOR MOBILE TERMINAL SCREEN

(71) Applicant: SAMSUNG ELECTRONICS CO., LTD., Suwon-si (KR)

(72) Inventors: Ho-cheon Wey, Seongnam-si (KR); Chang-yeong Kim, Seoul (KR); Chan-yul Kim, Bucheon-si (KR); Jeong-hoon Park, Seoul (KR); Myung-jin Eom, Seoul (KR); Seong-wook Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/906,075

(22) PCT Filed: Jul. 18, 2014

(86) PCT No.: PCT/KR2014/006552
§ 371 (c)(1),
(2) Date: Jan. 19, 2016

(87) PCT Pub. No.: WO2015/009107
PCT Pub. Date: Jan. 22, 2015

(65) Prior Publication Data
US 2016/0163023 A1   Jun. 9, 2016

(30) Foreign Application Priority Data
Jul. 19, 2013  (KR) .................. 10-2013-0085689

(51) Int. Cl.
*G06T 3/40*  (2006.01)

(52) U.S. Cl.
CPC .............. *G06T 3/4053* (2013.01); *G06T 3/40* (2013.01)

(58) Field of Classification Search
None
See application file for complete search history.

(56) References Cited

U.S. PATENT DOCUMENTS

| 8,350,936 B2 | 1/2013 | Tin |
| 2007/0009050 A1* | 1/2007 | Wang ................... H04N 19/176 375/240.29 |

(Continued)

FOREIGN PATENT DOCUMENTS

| KR | 10-0834557 B1 | 6/2008 |
| KR | 10-0954303 B1 | 4/2010 |

OTHER PUBLICATIONS

Search Report dated Oct. 23, 2014, issued by the International Searching Authority in counterpart International Application No. PCT/KR2014/006552 (PCT/ISA/210).

(Continued)

*Primary Examiner* — Ke Xiao
*Assistant Examiner* — Jed-Justin Imperial
(74) *Attorney, Agent, or Firm* — Sughrue Mion, PLLC

(57) ABSTRACT

A method and apparatus for generating a 3K-resolution display image for a mobile terminal screen are disclosed. The method includes: receiving an input image; selecting a 3K resolution as a resolution of an image to be reproduced on the mobile terminal screen of a predetermined size, based on human cognitive characteristics and resolution analytical ability with respect to the mobile terminal screen; and generating a display image having the selected 3K resolution by using the input image.

11 Claims, 10 Drawing Sheets

(56) References Cited

U.S. PATENT DOCUMENTS

2011/0150217 A1 6/2011 Kim et al.
2011/0211122 A1 9/2011 Sullivan
2015/0279335 A1* 10/2015 Ripp ...................... G09G 5/26
 345/428

OTHER PUBLICATIONS

Written Opinion dated Oct. 23, 2014, issued by the International Searching Authority in counterpart International Application No. PCT/KR2014/006552 (PCT/ISA/237).

* cited by examiner

Fig. 9

| PIXEL POSITION | COEFFICIENT | PIXEL POSITION | COEFFICIENT |
|---|---|---|---|
| 0 | {0,0,0,64,0,0,0,0} | 5 | {-1,4,-11,52,26,-8,3,-1,0} |
| 1 | {0,1,-3,64,8,-3,1,0} | 6 | {-1,4,-11,50,28,-8,2,0} |
| 2 | {-1,2,-5,62,8,-3,1,0} | 7 | {-1,4,-11,44,35,-10,4,-1} |
| 3 | {-1,3,-8,60,13,-4,1,0} | 8 | {-1,4,-11,44,35,-10,4,-1} |
| 4 | {-1,4,-10,58,17,-5,1,0} | | |

…

METHOD AND APPARATUS FOR GENERATING 3K-RESOLUTION DISPLAY IMAGE FOR MOBILE TERMINAL SCREEN

TECHNICAL FIELD

One or more embodiments of the present invention relate to a method and apparatus for generating a 3K-resolution display image for a mobile terminal screen.

BACKGROUND ART

Recently, along with the development of super-resolution image display technology, a super-resolution image display having a definition exceeding the number of pixels per inch, which is identifiable by the human retina, has been highly demanded even for a mobile terminal screen.

DISCLOSURE OF INVENTION

Technical Problem

However, the reproduction of a higher-resolution image in a mobile terminal may cause an increase in manufacturing costs, power consumption, and the amount of image data transmission of the mobile terminal.

Therefore, since providing a high-quality image exceeding the human cognitive domain results in a waste of energy and a decrease in performance, the necessity for generating and displaying an image having the most effective resolution depending on a screen size of a mobile terminal has been increasing.

Solution to Problem

According to one or more embodiments of the present invention, a method of generating a 3K-resolution display image for a mobile terminal screen includes: receiving an input image; selecting a 3K resolution as a resolution of an image to be reproduced on the mobile terminal screen of a predetermined size, based on human cognitive characteristics and resolution analytical ability with respect to the mobile terminal screen; and generating a display image having the selected 3K resolution by using the input image.

Additional aspects will be set forth in part in the description which follows and, in part, will be apparent from the description, or may be learned by practice of the presented embodiments.

Advantageous Effects of Invention

The method of generating a 3K-resolution image for a mobile terminal screen, according to an embodiment of the present invention, may provide the highest resolution at which a user may recognize a difference in the definition of image, as an optimal resolution.

BRIEF DESCRIPTION OF DRAWINGS

FIG. 9 is a table of coefficients of an up-sampling filter used for up-sampling a scalable 3K-resolution image, according to an embodiment of the present invention;

BEST MODE FOR CARRYING OUT THE INVENTION

Figure 1A:
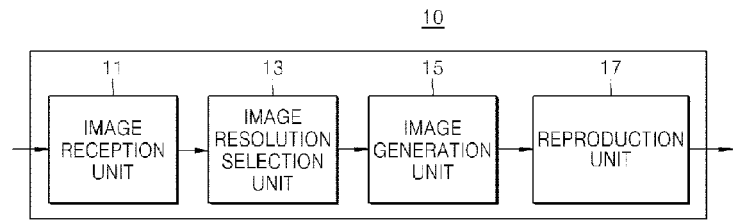
FIG. 1A is a block diagram of a mobile terminal for generating a 3K-resolution image for a mobile terminal screen, according to an embodiment of the present invention.

One or more embodiments of the present invention include a method and apparatus for generating a 3K-resolution display image for a mobile terminal screen.

Additional aspects will be set forth in part in the description which follows and, in part, will be apparent from the description, or may be learned by practice of the presented embodiments.

According to one or more embodiments of the present invention, a method of generating a 3K-resolution display image for a mobile terminal screen includes: receiving an input image; selecting a 3K resolution as a resolution of an image to be reproduced on the mobile terminal screen of a predetermined size, based on human cognitive characteristics and resolution analytical ability with respect to the mobile terminal screen; and generating a display image having the selected 3K resolution by using the input image.

The selecting of the 3K resolution may include selecting the 3K resolution as a resolution of an image to be reproduced on the mobile terminal screen of a 4.6- to 6.1-inch size based on a 2.0 eyesight and a viewing distance of 12 inches, based on human cognitive characteristics and resolution analytical ability.

The selecting of the 3K resolution may include selecting the 3K resolution as a resolution of an image to be reproduced on the mobile terminal screen of a 5.1- to 6.8-inch size based on a 1.0 eyesight and a viewing distance of 8 inches, based on human cognitive characteristics and resolution analytical ability.

The generating of the display image may include generating a super-resolution image by performing non-integer interpolation on the input image.

The generating of the super-resolution image may include generating a 3K-resolution output image by performing non-integer interpolation on the input image of a 2K resolution.

The 2K resolution may indicate a full high definition (FHD: 2560×1080) resolution, and the 3K resolution may indicate a 2560×1440 resolution.

The generating of the super-resolution image may include generating the 3K-resolution output image having the same aspect ratio as that of the input image through the non-integer interpolation.

The receiving of the input image may include receiving a base layer stream and an enhancement layer stream, and the generating of the display image may include: restoring a native-resolution image by decoding the base layer stream; restoring a super-resolution image by using encoding information decoded from the enhancement layer stream and the native-resolution image; and generating the display image by using the restored super-resolution image.

The enhancement layer stream may include a first enhancement layer stream and a second enhancement layer stream, and the generating of the display image may include: restoring a first super-resolution image by using encoding information decoded from the first enhancement layer stream and the native-resolution image; and restoring a second super-resolution image by using encoding information decoded from the second enhancement layer stream and the first super-resolution image.

The generating of the display image may include: up-sampling the native-resolution image by using an up-sampling filter; and restoring a super-resolution image by using encoding information decoded from the enhancement layer stream and the up-sampled native-resolution image.

The up-sampling of the native-resolution image may include selecting the up-sampling filter configured with a different coefficient for each of sub-pixel positions.

The selecting of the up-sampling filter may include selecting one of eight-tap filters configured with a coefficient {0, 0, 0, 64, 0, 0, 0, 0} corresponding to a zeroth pixel position, a coefficient {0, 1, −3, 63, 4, −2, 1, 0} corresponding to a first pixel position, a coefficient {−1, 2, −5, 62, 8, −3, 1, 0} corresponding to a second pixel position, a coefficient {−1, 3, −8, 60, 13, −4, 1, 0} corresponding to a third pixel position, a coefficient {−1, 4, −10, 58, 17, −5, 1, 0} corresponding to a fourth pixel position, a coefficient {−1, 4, −11, 52, 26, −8, 3, −1, 0} corresponding to a fifth pixel position, a coefficient {−1, 4, −11, 50, 28, −8, 2, 0} corresponding to a sixth pixel position, a coefficient {−1, 4, −11, 44, 35, −10, 4, −1} corresponding to a seventh pixel position, and a coefficient {−1, 4, −11, 40, 40, −11, 4, −1} corresponding to an eighth pixel position.

The receiving of the input image may include acquiring a flag indicating a resolution conversion method from a media presentation description (MPD) header of an image stream of a dynamic adaptive streaming over hypertext transfer protocol (DASH) transport format.

The receiving of the input image may include receiving an up-sampling filter coefficient based on a value of the flag.

The generating of the display image may include: up-sampling the native-resolution image by applying the received up-sampling filter coefficient; and restoring a super-resolution image by using encoding information decoded from the enhancement layer stream and the up-sampled native-resolution image.

The receiving of the input image may include acquiring mobile terminal model information based on a value of the flag.

The selecting of the 3K resolution may include selecting a resolution of an image to be reproduced on the mobile terminal screen based on the acquired mobile terminal model information, and the generating of the display image may include selectively decoding the base layer stream and the enhancement layer stream based on the selected resolution.

The receiving of the input image may include receiving an enhancement layer stream encoded to a plurality of layers depending on a reproduction variable, and the restoring of the super-resolution image may include restoring the super-resolution image by using encoding information decoded from the enhancement layer stream, the reproduction variable, and the native-resolution image.

The brightness or a sense of color of the super-resolution image may be determined based on the reproduction variable.

The method may further include reproducing the generated display image having the selected 3K resolution on a display unit of the mobile terminal.

The method may further include transmitting the generated display image to the mobile terminal.

The receiving of the input image may include receiving a base layer image, the generating of the display image may include: generating an enhancement layer image by performing non-integer interpolation on the base layer image; generating a base layer stream by encoding the base layer image; and generating an enhancement layer stream by using the base layer image to encode the enhancement layer image, and the method may further include transmitting the base layer stream and the enhancement layer stream to the mobile terminal.

The generating of the display image may include: generating a first enhancement layer image by performing non-integer interpolation on the base layer image; generating a second enhancement layer image by performing non-integer interpolation on the first enhancement layer image; generating a base layer stream by encoding the base layer image; generating a first enhancement layer stream by using the base layer image to encode the first enhancement layer image; and generating a second enhancement layer stream by using the first enhancement layer image to encode the second enhancement layer image, and the method may further include transmitting the generated base layer stream, the generated first enhancement layer stream, and the generated second enhancement layer stream to the mobile terminal.

The transmitting may include transmitting the base layer stream and the enhancement layer stream in a DASH transport format including an MPD header, and the MPD header of the DASH transport format may include a flag indicating a resolution conversion method, an up-sampling filter coefficient, and mobile terminal model information.

The transmitting may include transmitting an enhancement layer stream for restoring an image having 2K, 3K, and/or 4K resolutions based on the mobile terminal model information.

The transmitted enhancement layer stream may include a plurality of layer streams generated depending on the reproduction variable.

According to one or more embodiments of the present invention, an apparatus for generating a 3K-resolution display image for a mobile terminal screen includes: an image reception unit for receiving an input image; an image resolution selection unit for selecting a 3K resolution as a resolution of an image to be reproduced on the mobile terminal screen of a predetermined size, based on human cognitive characteristics and resolution analytical ability with respect to the mobile terminal screen; and an image generation unit for generating a display image having the selected 3K resolution by using the input image.

The image generation unit may include an image interpolation unit for generating a super-resolution image by performing non-integer interpolation on the input image.

The image reception unit may include: a base layer reception unit for receiving a base layer stream; and an enhancement layer reception unit for receiving an enhancement layer stream, and the image generation unit may further include: a native-resolution image restoration unit for restoring a native-resolution image by decoding the base layer stream; and a super-resolution image restoration unit for restoring a super-resolution image by using encoding information decoded from the enhancement layer stream and the native-resolution image, wherein the image generation unit generates the display image having the selected 3K resolution by using the restored super-resolution image.

The image reception unit may acquire a flag indicating a resolution conversion method from a media presentation description (MPD) header of an image stream of a dynamic adaptive streaming over hypertext transfer protocol (DASH) transport format.

The image reception unit may receive an enhancement layer stream encoded to a plurality of layers depending on a reproduction variable, and the image generation unit may restore the super-resolution image by using encoding information decoded from the enhancement layer stream, the reproduction variable, and the native-resolution image.

The apparatus may further include a reproduction unit for reproducing the generated display image having the selected 3K resolution on a display unit of the mobile terminal.

The image reception unit may receive a base layer image, the image generation unit may include: an image interpolation unit for generating an enhancement layer image by performing non-integer interpolation on the base layer image; a base layer encoding unit for generating a base layer stream by encoding the base layer image; and an enhancement layer encoding unit for generating an enhancement layer stream by using the base layer image to encode the enhancement layer image, and the apparatus may further include an output unit for transmitting the base layer stream and the enhancement layer stream to the mobile terminal.

The output unit may further include a header transmission unit for transmitting the base layer stream and the enhancement layer stream in a DASH transport format including an MPD header, and the MPD header of the DASH transport format may include a flag indicating a resolution conversion method, an up-sampling filter coefficient, and mobile terminal model information.

According to one or more embodiments of the present invention, a non-transitory computer-readable storage medium stores therein program instructions, which when executed by a computer, perform the above method.

MODE FOR THE INVENTION

Hereinafter, methods of manufacturing and using the present invention will be described in detail. In addition, a term, such as " . . . unit" or "module", disclosed in the specification indicates a unit for processing at least one function or operation, and this unit may be implemented by hardware, software, or a combination thereof.

A mobile terminal according to an embodiment of the present invention may be implemented in various forms. For example, examples of the mobile terminal described in the specification may include a cellular phone, a smartphone, a laptop computer, a tablet personal computer (PC), an e-book terminal, a digital broadcasting terminal, a personal digital assistant (PDA), a portable multimedia player (PMP), a navigation machine, and the like but are not limited thereto.

A 2K resolution according to an embodiment of the present invention indicates a full high definition (FHD: 2560×1080) resolution, a 3K resolution indicates a 2560× 1440 resolution, and a 4K resolution indicates an ultra high definition (UHD: 3840×2160) resolution, wherein 2K, 3K, and 4K are values approximately corresponding to the number of horizontal pixels of each resolution. Therefore, it will be understood by those of ordinary skill in the art to which the present invention belongs that each of the terms "2K resolution", "3K resolution", and "4K resolution" is not necessarily limited to a combination of the horizontal and vertical sizes described above and may correspond to a horizontal size in a resolution of an arbitrary combination of horizontal and vertical sizes.

In the specification, "an embodiment" of the principles of the present invention and various modifications of this expression indicate that a specific feature, structure, and characteristic related to the embodiment are included in at least one embodiment of the principles of the present invention. Thus, the expression "in an embodiment" and other arbitrary modifications disclosed in the entire specification do not necessarily indicate the same embodiment.

The term "image" used throughout the specification may be used as not only the term "image" itself but also a comprehensive term, such as "picture", "frame", "field", or "slice", for describing various formats of video image information which may be known in related fields.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

FIG. 1A is a block diagram of an apparatus 10 (hereinafter, referred to as a mobile terminal) for generating a 3K-resolution image for a mobile terminal screen, according to an embodiment of the present invention.

Referring to FIG. 1A, the mobile terminal 10 according to an embodiment of the present invention may include an image reception unit 11, an image resolution selection unit 13, an image generation unit 15, and a reproduction unit 17.

The image reception unit 11 according to an embodiment of the present invention may receive an input image. In detail, the received input image according to an embodiment of the present invention may be an image data stream encoded under a video compression standard, such as moving picture experts group (MPEG), H.26X, high efficiency video coding (HEVC), audio video coding standard (AVS), VPx, or the like, to generate a 3K-resolution image.

The received input image according to another embodiment of the present invention may be a layer stream to which scalable video coding (SVC) has been applied, to generate a 3K-resolution image. The layer stream may include a base layer stream and an enhancement layer stream for up-sampling.

The image reception unit 11 according to another embodiment of the present invention may acquire a flag indicating a resolution conversion method from a media presentation description (MPD) header of an image stream of a dynamic adaptive streaming over hypertext transfer protocol (DASH) transport format. In addition, an up-sampling filter coefficient or mobile terminal model information may be acquired based on the acquired flag.

The image resolution selection unit 13 according to an embodiment of the present invention may select the 3K resolution as a resolution of an image to be reproduced on the mobile terminal screen of a predetermined size based on human cognitive characteristics and resolution analytical ability with respect to the mobile terminal screen.

For example, according to an embodiment of the present invention, the 3K resolution may be selected as a resolution of an image to be reproduced on the mobile terminal screen of a 4.6- to 6.1-inch size based on a 2.0 eyesight and a viewing distance of 12 inches, based on human cognitive characteristics and resolution analytical ability.

As another example, according to another embodiment of the present invention, the 3K resolution may be selected as a resolution of an image to be reproduced on the mobile terminal screen of a 5.1- to 6.8-inch size based on a 1.0 eyesight and a viewing distance of 8 inches, based on human cognitive characteristics and resolution analytical ability.

The reason why the 3K resolution is selected is to efficiently implement an image of a resolution having a definition exceeding pixels per unit area of which a change in the definition is identifiable with the human retina. Herein the pixels per unit area may be represented by pixels per inch (PPI), and if a screen size (inch) increases even for an image having the same resolution, a PPI value may decrease, thereby resulting in low definition.

In consideration of human visual cognitive characteristics and resolution analytical ability, the pixels per unit area, which are identifiable with the human retina, are limited. That is, in a PPI value exceeding a limited value which is identifiable with the human retina, no matter how a resolution increases, a human being cannot identify a change in the definition. The maximum number of PPI of which a change in the definition is identifiable by a human being is referred to as a limited PPI. Therefore, it may cause an unnecessary waste of energy and a decrease in performance to display an image of a resolution having a definition exceeding the limited PPI.

Since the limited PPI described above is the maximum number of PPI of which a change in the definition is identifiable by a human being, a user may recognize a decrease in the definition when an image having a definition that is less than the limited PPI is displayed on the mobile terminal screen.

Therefore, under a general mobile terminal use condition, in order not to cause the decrease in performance of the mobile terminal 10 while the user does not recognize a decrease in the definition, it may be most efficient to provide an image of a resolution having a definition slightly exceeding the limited PPI.

In consideration of human visual cognitive characteristics and resolution analytical ability, the limited PPI is not simply influenced only by a resolution of the mobile terminal screen but also by the eyesight of the user, a mobile terminal screen viewing distance, and a size of the mobile terminal screen.

Figure 2:
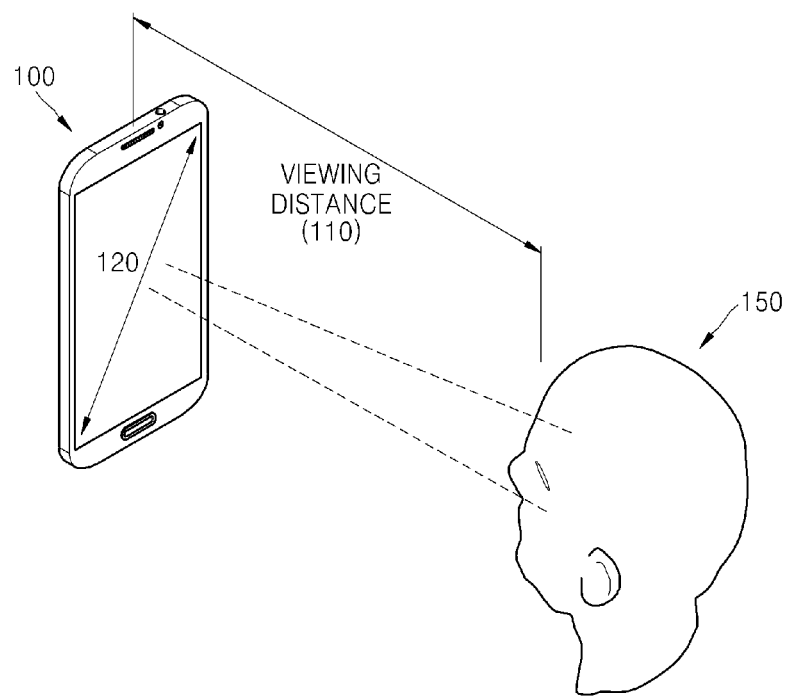
FIG. 2 is a schematic diagram for describing human visual cognitive characteristics and resolution analytical ability according to a screen size and a viewing distance, according to an embodiment of the present invention.

For example, FIG. 2 is a schematic diagram for describing human visual cognitive characteristics and resolution analytical ability according to a screen size and a viewing distance, according to an embodiment of the present invention.

Referring to FIG. 2, in general, a user 150 maintains a predetermined viewing distance 110 to view a screen of a mobile terminal 100 of a predetermined screen size 120. Herein, the number of PPI, which is identifiable with the human retina according to human visual cognitive characteristics and resolution analytical ability, is influenced by the eyesight of the user 150, a screen resolution of the mobile terminal 100, the screen size 120 of the mobile terminal 100, and the viewing distance 110.

Statistically, when the eyesight of the user 150 of the mobile terminal 100 is 2.0, the user 150 prefers the viewing distance 110 to be 12 inches, and when the eyesight of the user 150 of the mobile terminal 100 is 1.0, the user 150 prefers the viewing distance 110 to be 8 inches. Therefore, a method of determining an optimal resolution that guarantees the limited PPI according to the two conditions described above will be described below.

Figure 3A:
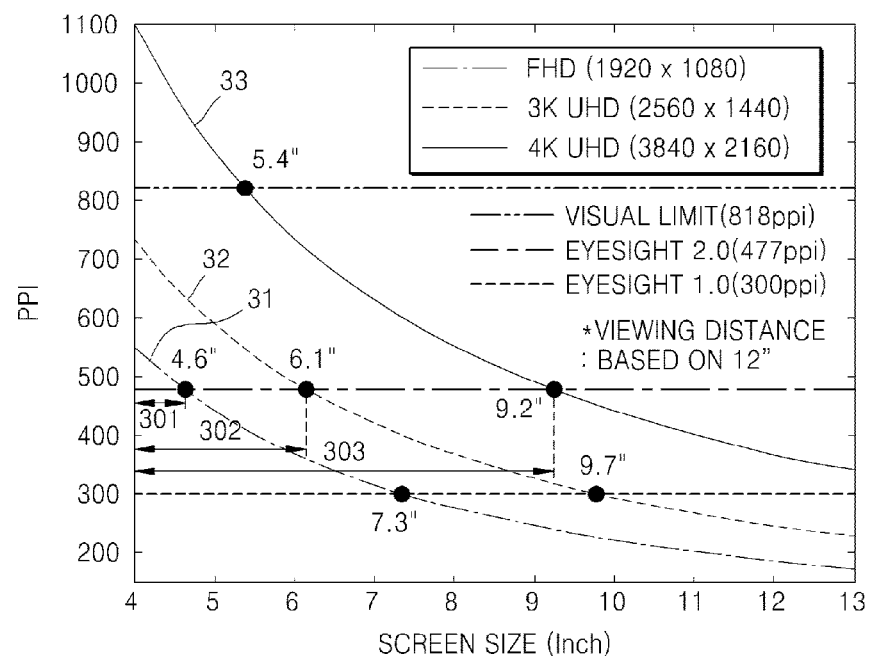
FIG. 3A is a graph showing a change in pixels per inch (PPI) according to a screen size and an image resolution based on a viewing distance of 12 inches.

In detail, FIG. 3A is a graph showing a change in PPI according to a screen size and an image resolution based on a viewing distance of 12 inches.

It is assumed that the limited PPI of which a change in the definition is identifiable with the human retina based on the viewing distance of 12 inches is 477 PPI when the eyesight of a user is 2.0.

Referring to FIG. 3A, curves 31, 32, and 33 indicate the relationships between a screen size and PPI for reproducing 2K-, 3K-, and 4K-resolution images, respectively.

For example, according to the curve 31 for the 2K-resolution image based on the 2.0 eyesight of the user and the viewing distance of 12 inches, a definition exceeding the limited PPI is achieved in a screen size 301 of 4.6 inches or less. In addition, according to the curve 32 for the 3K-resolution image, a definition exceeding the limited PPI is achieved in a screen size 302 of 6.1 inches or less. In addition, according to the curve 33 for the 4K-resolution image, a definition exceeding the limited PPI is achieved in a screen size 303 of 9.2 inches or less.

Therefore, for the mobile terminal 100 having the screen size 120 of 4.6 inches or more and 6.1 inches or less, when a 2K-resolution image is displayed based on the 2.0 eyesight of the user 150 and the viewing distance 110 of 12 inches, the user 150 may recognize a decrease in image quality according to a decrease in the definition. However, when a 3K-resolution image is displayed, the user 150 may not recognize a decrease in image quality. In addition, even when a 4K-resolution image is displayed, the user 150 may not recognize a decrease in image quality, but more energy and performance than when the 3K-resolution image is displayed may be necessary. Therefore, for the mobile terminal 100 having the screen size 120 of 4.6 inches or more and 6.1 inches or less, it is most efficient to display a 3K-resolution image based on the 2.0 eyesight of the user 150 and the viewing distance 110 of 12 inches.

Figure 3B:
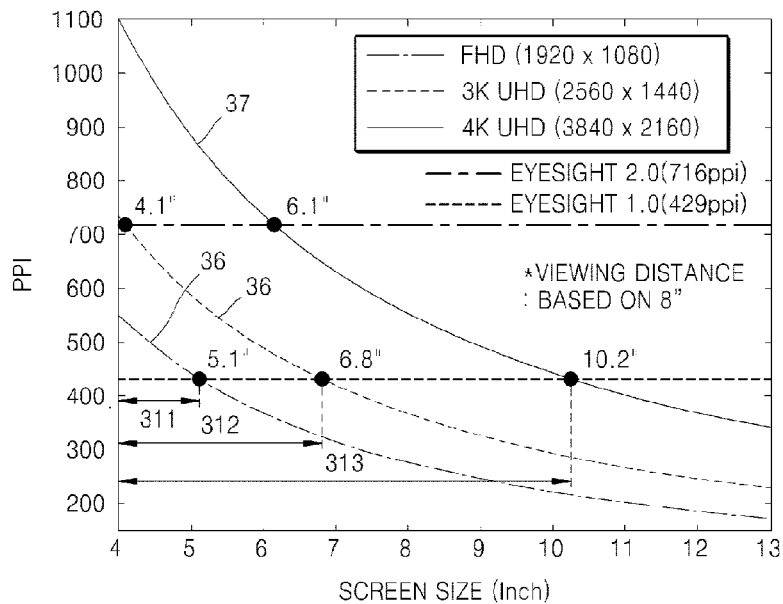
FIG. 3B is a graph showing a change in PPI according to a screen size and an image resolution based on a viewing distance of 8 inches.

FIG. 3B is a graph showing a change in PPI according to a screen size and an image resolution based on a viewing distance of 8 inches.

It is assumed that the limited PPI of which a change in the definition is identifiable with the human retina based on the viewing distance of 8 inches is 429 PPI when the eyesight of a user is 1.0.

Referring to FIG. 3B, curves 35, 36, and 37 indicate the relationships between a screen size and PPI for reproducing 2K-, 3K-, and 4K-resolution images, respectively.

For example, according to the curve 35 for the 2K-resolution image based on the 1.0 eyesight of the user and the viewing distance of 8 inches, a definition exceeding the limited PPI is achieved in a screen size 311 of 5.1 inches or less. In addition, according to the curve 36 for the 3K-resolution image, a definition exceeding the limited PPI is achieved in a screen size 312 of 6.8 inches or less. In addition, according to the curve 37 for the 4K-resolution image, a definition exceeding the limited PPI is achieved in a screen size 313 of 10.2 inches or less.

Therefore, for the mobile terminal 100 having the screen size 120 of 5.1 inches or more and 6.8 inches or less, when a 2K-resolution image is displayed based on the 1.0 eyesight of the user 150 and the viewing distance 110 of 8 inches, the user 150 may recognize a decrease in image quality according to a decrease in the definition.

However, when a 3K-resolution image is displayed, the user 150 may not recognize a decrease in image quality. In addition, even when a 4K-resolution image is displayed, the user 150 may not recognize a decrease in image quality, but more energy and performance than when the 3K-resolution image is displayed may be necessary.

Therefore, for the mobile terminal 100 having the screen size 120 of 5.1 inches or more and 6.8 inches or less, it is most efficient to display a 3K-resolution image based on the 1.0 eyesight of the user 150 and the viewing distance 110 of 8 inches.

Referring back to FIG. 1A, the image resolution selection unit 13 according to another embodiment of the present invention may select a resolution of an image to be reproduced on the mobile terminal screen based on model information of the mobile terminal 10.

The image generation unit 15 according to an embodiment of the present invention may generate a display image having the selected 3K resolution by using the input image.

In detail, the image generation unit 15 according to an embodiment of the present invention may further include an interpolation unit (not shown) for generating a super-resolution image by performing non-integer interpolation on the input image.

For example, the interpolation unit according to an embodiment of the present invention may generate a super-resolution image by performing non-integer interpolation on the input image. In detail, when a 2K-resolution image is inputted, a 3K- or 4K-resolution image may be obtained by performing non-integer interpolation on the 2K-resolution image.

Figure 4A:
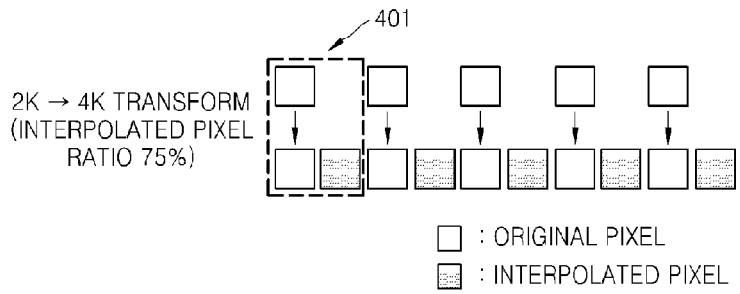
FIG. 4A illustrates a method of interpolating a 2K-resolution image to a 4K-resolution image, according to an embodiment of the present invention.

FIG. 4A illustrates a method of interpolating a 2K-resolution image to a 4K-resolution image, according to an embodiment of the present invention.

To interpolate a 2K-resolution image to a 4K-resolution image, an operation of magnifying the 2K-resolution image by integer times may be performed. As shown in FIG. 4A, when the 2K-resolution image is one-dimensionally interpolated to the 4K-resolution image, one pixel is interpolated to two pixels (referring to 401). Therefore, according to the two-dimensional aspect for performing actual image interpolation, it may be determined that one of every four pixels is used as it is while the remaining three pixels are interpolated. In this case, an aspect ratio before and after the interpolation is performed is maintained, and an interpolated pixel ratio is 75%.

Figure 4B:
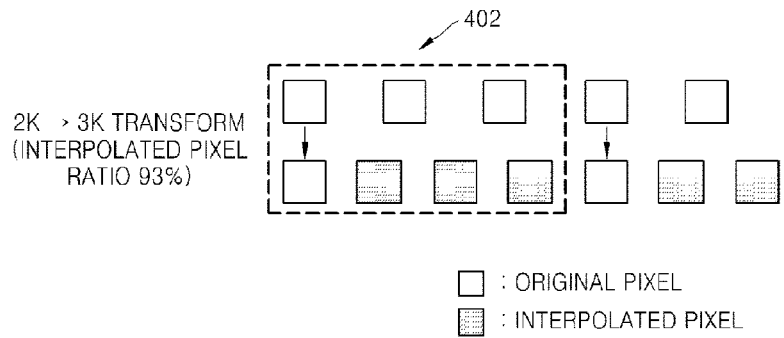
FIG. 4B illustrates a method of interpolating a 2K-resolution image to a 3K-resolution image, according to an embodiment of the present invention.

FIG. 4B illustrates a method of interpolating a 2K-resolution image to a 3K-resolution image, according to an embodiment of the present invention.

To interpolate a 2K-resolution image to a 3K-resolution image, an operation of magnifying the 2K-resolution image by non-integer times may be performed. As shown in FIG. 4B, when the 2K-resolution image is one-dimensionally interpolated to the 3K-resolution image, three pixels are interpolated to four pixels (referring to 402). Therefore, according to the two-dimensional aspect for performing actual image interpolation, it may be determined that one of every 16 pixels is used as it is while the remaining 15 pixels are interpolated. That is, in the 2K-resolution image, one pixel per every nine pixels may maintain a value thereof while the remaining pixels are interpolated to 15 pixels by using a filter for non-integer interpolation. In this case, an aspect ratio before and after the interpolation is performed is also maintained, and an interpolated pixel ratio is 93%.

As described above, an operation of performing non-integer interpolation from a 2K-resolution image to a 3K-resolution image results in a greater number of interpolated pixels than an operation of performing integer interpolation from a 2K-resolution image to a 4K-resolution image, and thus, in the operation of performing non-integer interpolation from a 2K-resolution image to a 3K-resolution image, detail may increase, thereby increasing image quality.

In addition, as described above, even though non-integer interpolation is performed, a 3K-resolution output image having the same aspect ratio as the input image may be generated as well as integer interpolation from a 2K-resolution image to a 4K-resolution image.

The mobile terminal 10 according to another embodiment of the present invention may restore a native-resolution image by decoding a base layer stream when the input image is a layer stream to which SVC has been applied. In this case, the image generation unit 15 may restore encoding information by decoding an enhancement layer stream. A super-resolution image is restored by using the encoding information restored from the enhancement layer stream and the native-resolution image restored from the base layer stream, and a display image having the 3K resolution may be generated by using the restored super-resolution image. A configuration of decoding a layer stream to which SVC has been applied will be described below with reference to FIGS. 6 to 11.

The image generation unit 15 according to another embodiment of the present invention may generate a display image having the 3K resolution based on a reproduction variable. The reproduction variable may include information on brightness or a sense of color of the display image to be generated. In addition, the reproduction variable may be used when a plurality of SNR-scalable enhancement layer streams are received. In addition, the reproduction variable may include a quantization parameter (QP) to be used to selectively restore a super-resolution image having various brightnesses or senses of color from an enhancement layer stream.

When the image generation unit 15 generates the display image having the selected 3K resolution by using the input image, the reproduction unit 17 according to an embodiment of the present invention may reproduce the generated display image on a display unit of the mobile terminal 10.

A particular operation of the mobile terminal 10 for generating a 3K-resolution image for a mobile terminal screen will now be described with reference to FIG. 1B.

Figure 1B:
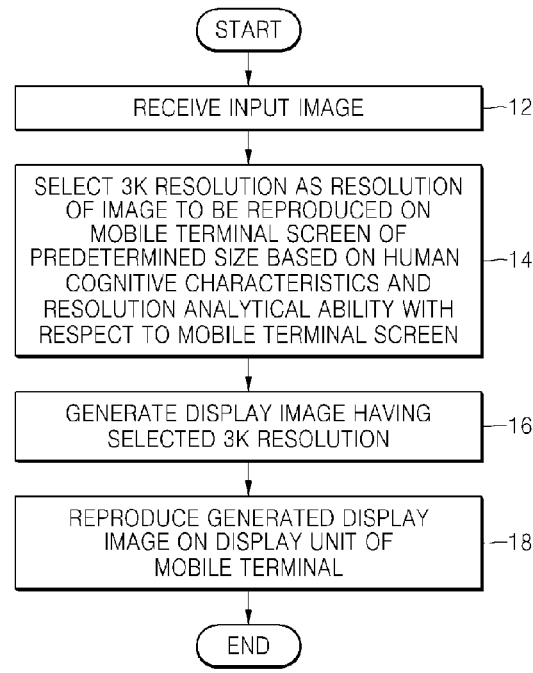
FIG. 1B is a flowchart of a method of generating a 3K-resolution image for a mobile terminal screen, according to an embodiment of the present invention.

FIG. 1B is a flowchart of a method of generating a 3K-resolution image for a mobile terminal screen, according to an embodiment of the present invention.

Referring to FIG. 1B, the method of generating a 3K-resolution image for a mobile terminal screen includes operations that are sequentially processed by the mobile terminal 10 shown in FIG. 1A. Therefore, although omitted hereinafter, the description of the mobile terminal 10 with respect to FIG. 1A is also applied to the method shown in FIG. 1B.

In operation 12, the image reception unit 11 according to an embodiment of the present invention receives an input image.

In operation 14, the image resolution selection unit 13 according to an embodiment of the present invention selects the 3K resolution as a resolution of an image to be reproduced on the mobile terminal screen of a predetermined size based on human cognitive characteristics and resolution analytical ability with respect to the mobile terminal screen.

For example, according to an embodiment of the present invention, the 3K resolution may be selected as a resolution of an image to be reproduced on the mobile terminal screen of a 4.6- to 6.1-inch size based on a 2.0 eyesight and a viewing distance of 12 inches, based on human cognitive characteristics and resolution analytical ability.

As another example, according to another embodiment of the present invention, the 3K resolution may be selected as a resolution of an image to be reproduced on the mobile terminal screen of a 5.1- to 6.8-inch size based on a 1.0 eyesight and a viewing distance of 8 inches, based on human cognitive characteristics and resolution analytical ability.

In operation 16, the image generation unit 15 according to an embodiment of the present invention generates a display image having the selected 3K resolution by using the input image.

In operation 18, the reproduction unit 17 according to an embodiment of the present invention reproduces the generated display image on the display unit.

As described above, the method of generating a 3K-resolution image for a mobile terminal screen, according to an embodiment of the present invention, may provide the highest resolution at which a user may recognize a difference in the definition of image, as an optimal resolution.

Figure 1C:
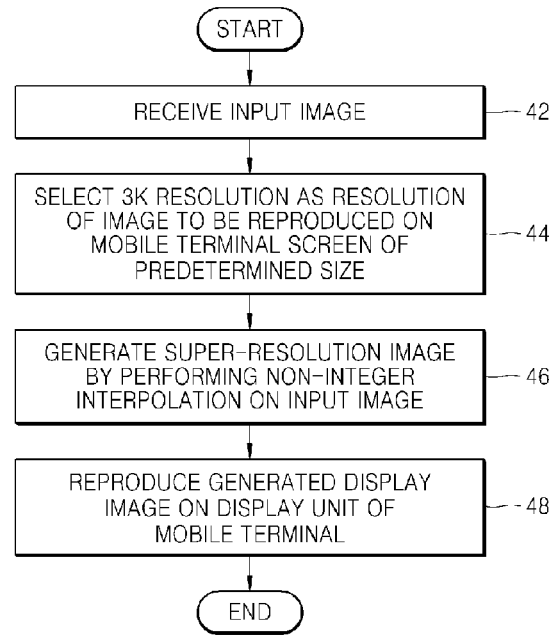
FIG. 1C is a flowchart of a method of generating a 3K-resolution image for a mobile terminal screen, according to another embodiment of the present invention.

FIG. 1C is a flowchart of a method of generating a 3K-resolution image for a mobile terminal screen, according to another embodiment of the present invention.

Referring to FIG. 1C, in operation 42, the image reception unit 11 according to an embodiment of the present invention receives an input image. For example, the received input image may be a 2K-resolution image.

In operation 44, the image resolution selection unit 13 according to an embodiment of the present invention selects the 3K resolution as a resolution of an image to be reproduced on the mobile terminal screen of a predetermined size based on human cognitive characteristics and resolution analytical ability with respect to the mobile terminal screen.

In operation 46, the image generation unit 15 according to an embodiment of the present invention generates a super-resolution image by performing non-integer interpolation on the input image. For example, when a 2K-resolution image is inputted, a 3K-resolution image may be obtained by performing non-integer interpolation on the 2K-resolution image. Since a method of obtaining the 3K-resolution image by performing non-integer interpolation on the 2K-resolution image has been described above, the method of obtaining the 3K-resolution image by performing non-integer interpolation on the 2K-resolution image is not described herein. The image generation unit 15 according to another embodiment of the present invention may acquire a 4K-resolution image by interpolating the 3K-resolution image again. Since an operation of interpolating the 3K-resolution image to the 4K-resolution image is similar to the operation performed to perform non-integer interpolation from the 2K-resolution image to the 3K-resolution image, a detailed description thereof is omitted.

In operation 48, the reproduction unit 17 according to an embodiment of the present invention reproduces the generated display image on the display unit.

Figure 5A:
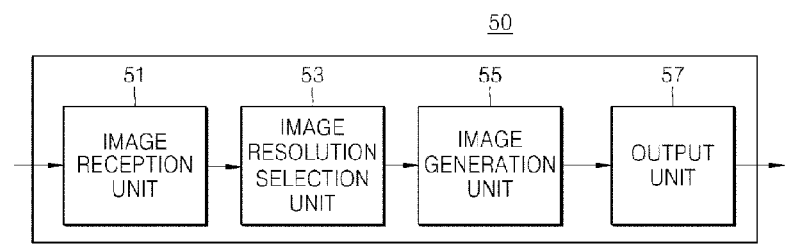
FIG. 5A is a block diagram of a content server for generating a 3K-resolution image for a mobile terminal screen, according to an embodiment of the present invention.

FIG. 5A is a block diagram of a content server 50 for generating a 3K-resolution image for a mobile terminal screen, according to an embodiment of the present invention.

Referring to FIG. 5A, the content server 50 according to an embodiment of the present invention may include an image reception unit 51, an image resolution selection unit 53, an image generation unit 55, and an output unit 57.

The image reception unit 51 according to an embodiment of the present invention may receive an input image. In detail, the received input image according to an embodiment of the present invention may be an image data stream encoded under a video compression standard, such as MPEG, H.26X, HEVC, AVS, VPx, or the like, to generate a 3K-resolution image.

The received input image according to another embodiment of the present invention may be a source image of a raw data format, which is a base layer image to be encoded according to SVC.

The received input image according to another embodiment of the present invention may be a layer stream to which SVC has been applied to generate a 3K-resolution image. The layer stream may include a base layer stream and an enhancement layer stream for up-sampling.

The image resolution selection unit 53 according to an embodiment of the present invention may select the 3K resolution as a resolution of an image to be reproduced on the mobile terminal screen of a predetermined size based on human cognitive characteristics and resolution analytical ability with respect to the mobile terminal screen.

The image generation unit 55 according to an embodiment of the present invention may generate a display image having the selected 3K resolution by using the input image.

In detail, the image generation unit 55 according to an embodiment of the present invention may further include an interpolation unit (not shown) for generating a super-resolution image by performing non-integer interpolation on the input image.

For example, the interpolation unit according to an embodiment of the present invention may generate a super-resolution image by performing non-integer interpolation on the input image. In detail, when a 2K-resolution image is inputted, a 3K- or 4K-resolution image may be obtained by performing non-integer interpolation on the 2K-resolution image.

The image generation unit 55 according to another embodiment of the present invention may restore a native-resolution image by decoding the base layer stream when the input image is a layer stream to which SVC has been applied. In this case, the image generation unit 55 may restore encoding information by decoding the enhancement layer stream. A super-resolution image is restored by using the encoding information restored from the enhancement layer stream and the native-resolution image restored from the base layer stream, and a display image having the 3K resolution may be generated by using the restored super-resolution image.

The image generation unit 55 according to another embodiment of the present invention may generate a base layer stream by encoding the inputted base layer image. In this case, the image generation unit 55 may generate an enhancement layer stream by using the base layer stream and an enhancement layer image.

Configurations of decoding and encoding a layer stream to which SVC has been applied will be described below with reference to FIGS. 6 to 11.

When the image generation unit 55 generates a display image having the selected 3K resolution by using the input image, the output unit 57 according to an embodiment of the present invention may transmit the generated display image to a mobile terminal.

In detail, the output unit 57 according to an embodiment of the present invention may transmit a base layer stream and an enhancement layer stream generated by performing SVC on the generated display image.

The output unit 57 according to another embodiment of the present invention may transmit the base layer stream and the enhancement layer stream in a DASH transport format including an MPD header. The MPD header of the DASH transport format may include a flag indicating a resolution conversion method, an up-sampling filter coefficient, and mobile terminal model information. A configuration of transmitting the flag indicating a resolution conversion method, the up-sampling filter coefficient, and the mobile terminal model information included in the MPD header of the DASH transport format will be described below with reference to FIG. 12.

The output unit 57 according to another embodiment of the present invention may transmit a reproduction variable. For example, in order for the content server 50 to transmit the reproduction variable to the mobile terminal 10, the image generation unit 55 may generate a plurality of enhancement layer streams having various brightnesses or senses of color depending on the reproduction variable when the enhancement layer stream is generated. In this case, the output unit 57 may transmit the plurality of enhancement layer streams to the mobile terminal 10. The reception unit of the mobile terminal 10 according to an embodiment of the present invention may receive an enhancement layer stream encoded by using a predetermined reproduction variable. Therefore, the image generation unit 15 may selectively restore a super-resolution image having various senses of color or brightnesses from the enhancement layer stream received based on the reproduction variable.

That is, the reproduction variable may be received, and a super-resolution image having various senses of color or brightnesses may be restored based on the received reproduction variable.

Figure 5B:
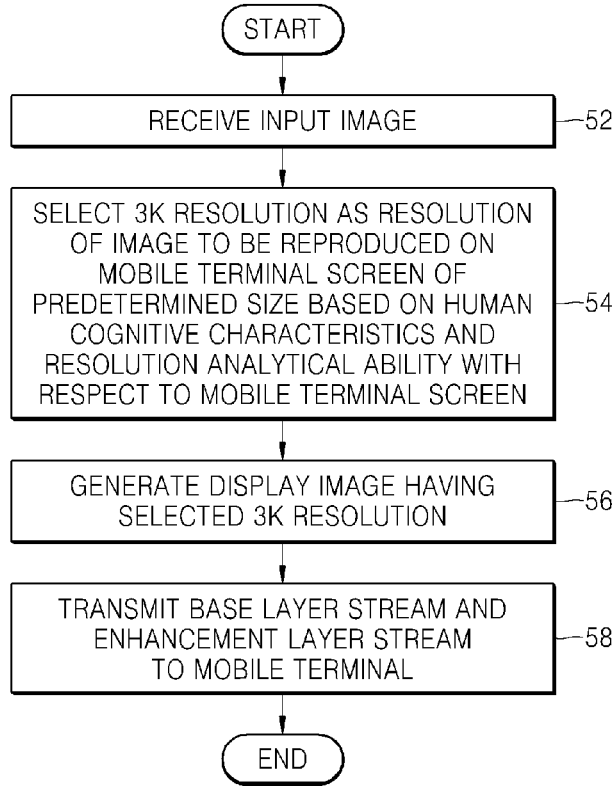
FIG. 5B is a flowchart of a method of transmitting a 3K-resolution image for a mobile terminal screen, according to an embodiment of the present invention.

FIG. 5B is a flowchart of a method of transmitting a 3K-resolution image for a mobile terminal screen, according to an embodiment of the present invention.

Referring to FIG. 5B, the method of transmitting a 3K-resolution image for a mobile terminal screen includes operations that are sequentially processed by the content server 50 shown in FIG. 5A. Therefore, although omitted hereinafter, the description of the content server 50 with respect to FIG. 5A is also applied to the method shown in FIG. 5B.

In operation 52, the image reception unit 51 according to an embodiment of the present invention receives an input image.

In operation 54, the image resolution selection unit 53 according to an embodiment of the present invention selects the 3K resolution as a resolution of an image to be reproduced on the mobile terminal screen of a predetermined size based on human cognitive characteristics and resolution analytical ability with respect to the mobile terminal screen.

In operation 56, the image generation unit 55 according to an embodiment of the present invention generates a display image having the selected 3K resolution by using the input image.

In operation 58, the output unit 57 according to an embodiment of the present invention transmits the generated display image to a mobile terminal.

Figure 6:
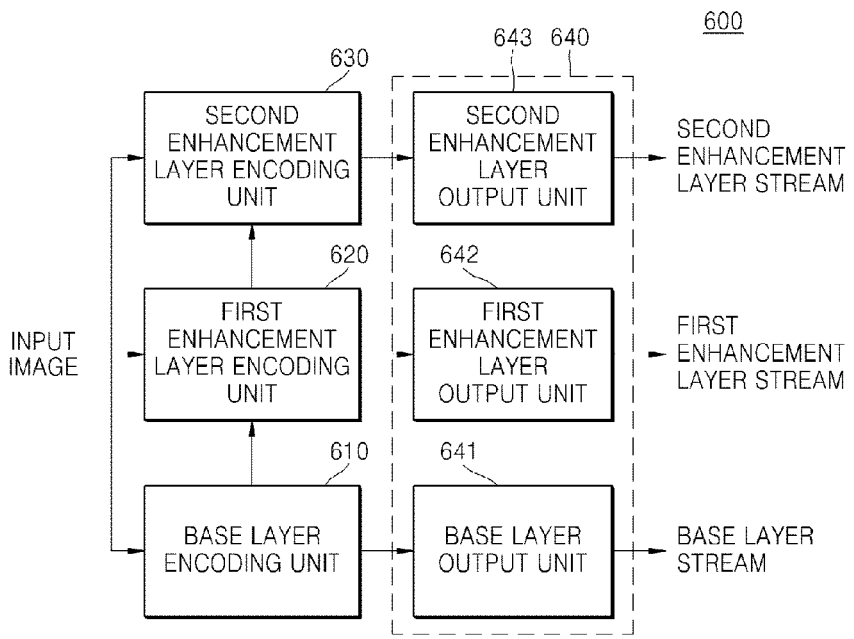
FIG. 6 is a block diagram of a scalable 3K-resolution image encoding device according to an embodiment of the present invention.

FIG. 6 is a block diagram of a scalable 3K-resolution image encoding device 600 according to an embodiment of the present invention.

The scalable 3K-resolution image encoding device 600 according to an embodiment of the present invention includes a base layer encoding unit 610, a first enhancement layer encoding unit 620, a second enhancement layer encoding unit 630, and an output unit 640. The output unit 640 may further include a base layer output unit 641, a first enhancement layer output unit 642, and a second enhancement layer output unit 643.

The base layer encoding unit 610 according to an embodiment of the present invention encodes a base layer image from among images classified to a plurality of layers.

In addition, the base layer encoding unit 610 may perform intra/inter prediction conversion, quantization, and entropy encoding for each block of the base layer image. The base layer output unit 641 may output a generated bitstream as a base layer stream. The base layer encoding unit 610 may transmit encoded data of a base layer image block to the first enhancement layer encoding unit 620. Alternatively, the base layer encoding unit 610 may transmit data of a restored image of the base layer image block to the first enhancement layer encoding unit 620. The restored data of the base layer image block may be up-sampled to a resolution of an enhancement layer image. When a block of a first enhancement layer image corresponding to the base layer image block is encoded, the up-sampled image of the base layer image may be referred to.

The first enhancement layer encoding unit 620 according to an embodiment of the present invention encodes the first enhancement layer image.

The first enhancement layer encoding unit 620 according to an embodiment of the present invention may encode the first enhancement layer image by using an image obtained by up-sampling an image obtained by restoring a portion or the whole area of the base layer image. For example, an up-sampling unit (refer to 850 of FIG. 8) as a filter having the coefficients shown in FIG. 9 may up-sample the base layer image by using an eight-tap filter configured with different coefficients respectively depending on sub-pixel positions.

The first enhancement layer encoding unit 620 may predict the first enhancement layer image by using the up-sampled image of the base layer image. A difference value between an up-sampled image block of the base layer image and a corresponding block on the first enhancement layer image may be encoded. Therefore, the first enhancement layer output unit 642 may output a first enhancement layer stream obtained by encoding a residual component and transition information between the up-sampled image of the base layer image and the first enhancement layer image.

The second enhancement layer encoding unit 630 may up-sample an image obtained by restoring a portion or the whole area of the first enhancement layer image and encode a second enhancement layer image by using the up-sampled image. Therefore, the second enhancement layer output unit 643 may output a second enhancement layer stream obtained by encoding a residual component and transition information between the up-sampled image of the first enhancement layer image and the second enhancement layer image. The second enhancement layer encoding unit 630 performs the same operation as that of the first enhancement layer encoding unit 620 except for referring to the first enhancement layer image instead of the base layer image. Therefore, a description of the same operations of the second enhancement layer encoding unit 630 and the first enhancement layer encoding unit 620 will be omitted hereinafter as well.

Figure 7:
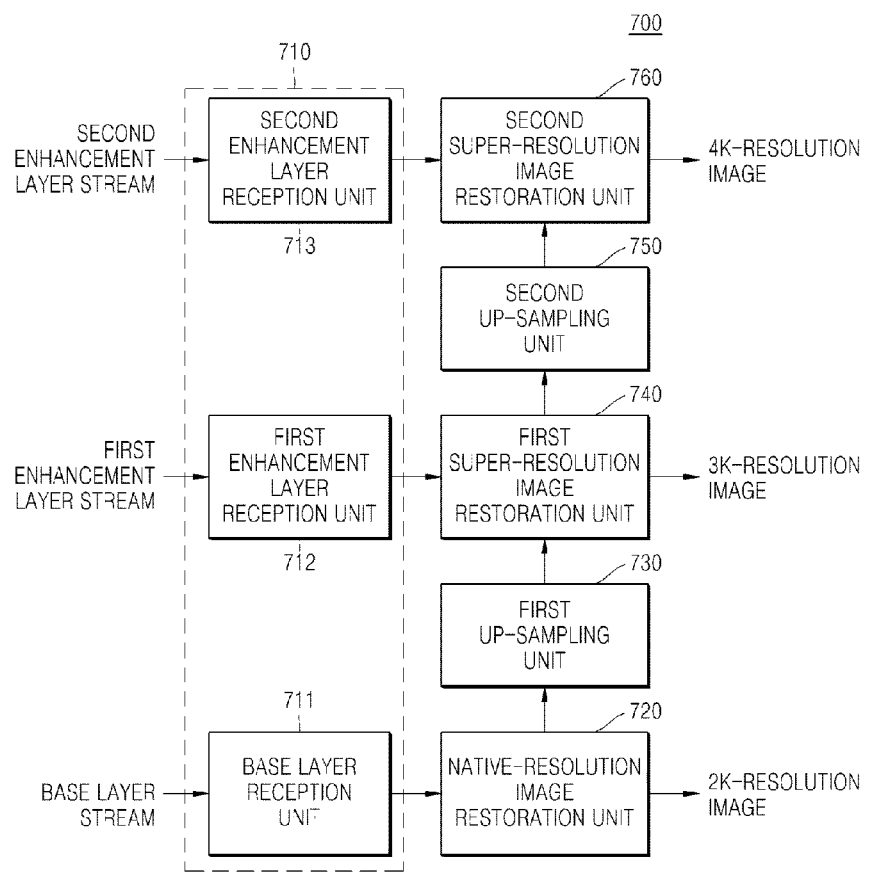
FIG. 7 is a block diagram of a scalable 3K-resolution image decoding device according to an embodiment of the present invention.

FIG. 7 is a block diagram of a scalable 3K-resolution image decoding device 700 according to an embodiment of the present invention.

Referring to FIG. 7, the scalable 3K-resolution image decoding device 700 according to an embodiment of the present invention may include a reception unit 710, a native-resolution image restoration unit 720, a first up-sampling unit 730, a first super-resolution image restoration unit 740, a second first up-sampling unit 750, and a second super-resolution image restoration unit 760. The reception unit 710 may include a base layer reception unit 711 for receiving a layer stream of each layer, a first enhancement layer reception unit 712, and a second enhancement layer reception unit 713. Herein, a native-resolution image may be a 2K-resolution image, a first super-resolution image may be a 3K-resolution image, and a second super-resolution image may be a 4K-resolution image.

The reception unit 710 of the scalable 3K-resolution image decoding device 700 may receive a bitstream including encoded data of a video. The base layer reception unit 711 may receive an encoded data stream of a native-resolution image from the received bitstream. In addition, the first enhancement layer reception unit 712 and the second enhancement layer reception unit 713 may receive a first enhancement layer stream and a second enhancement layer stream, respectively.

The reception unit 710 according to another embodiment of the present invention may acquire a flag indicating a resolution conversion method from an MPD header of an image stream when the received data stream has a DASH transport format. A configuration of acquiring a flag and referring to the flag for image decoding will be described in detail with reference to FIGS. 12 and 13.

The native-resolution image restoration unit 720 may restore a native-resolution image by decoding received encoded data of the native-resolution image.

The first super-resolution image restoration unit 740 may decode a first super-resolution image by using an up-sampled image of an image obtained by restoring a portion or the whole area of the native-resolution image. Alternatively, the first super-resolution image restoration unit 740 may decode the first super-resolution image by referring to the encoded data of the native-resolution image. Alternatively, the first super-resolution image restoration unit 740 may decode the first super-resolution image from the first enhancement layer stream by referring to the restored image of the native-resolution image.

The second super-resolution image restoration unit 760 according to an embodiment of the present invention performs the same operation as that of the first super-resolution image restoration unit 740 except for the use of the first super-resolution image instead of the native-resolution image, and thus, a description thereof is omitted.

Figure 8:
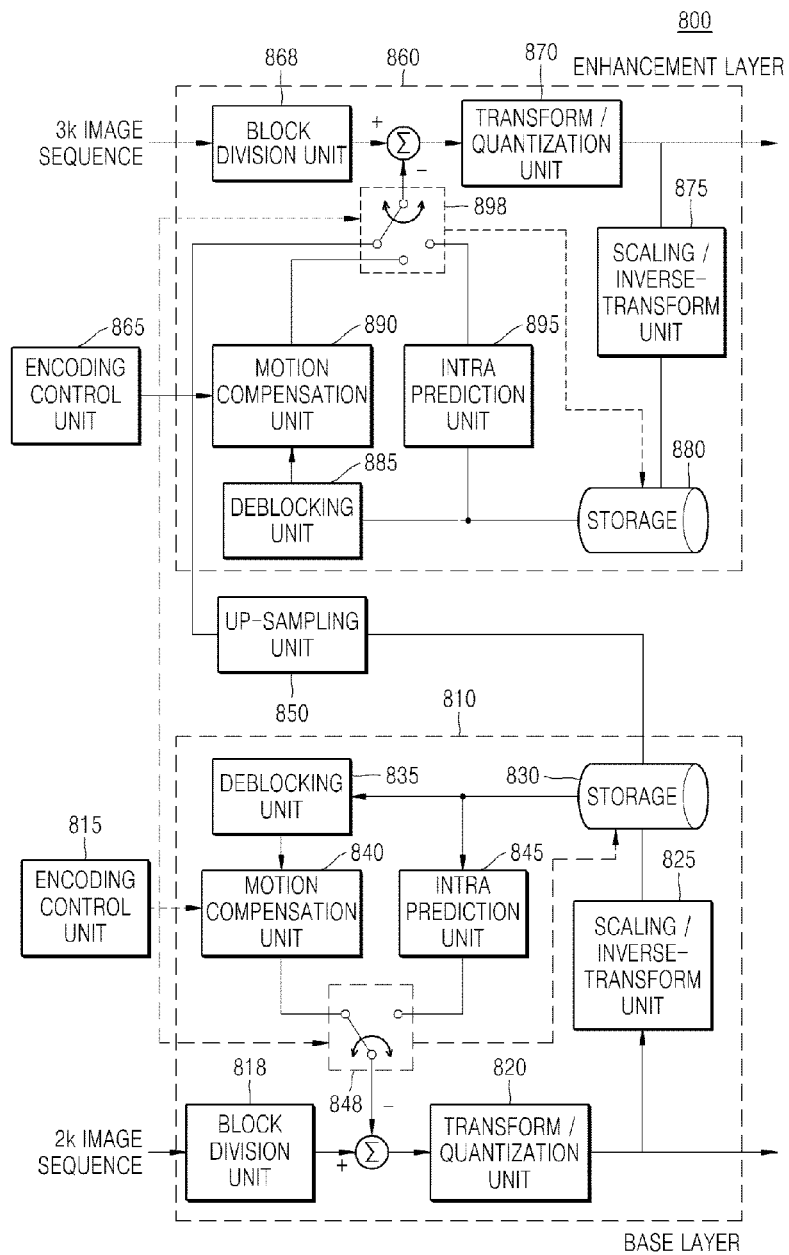
FIG. 8 is a block diagram of a scalable 3K-resolution image encoding system according to an embodiment of the present invention.

FIG. 8 is a block diagram of a scalable 3K-resolution image encoding system 800 according to an embodiment of the present invention.

The scalable 3K-resolution image encoding system 800 includes a base layer encoding unit 810 and an enhancement layer encoding unit 860. The base layer encoding unit 810 and the enhancement layer encoding unit 860 may correspond to the base layer encoding unit 610 and the first enhancement layer encoding unit 620 of FIG. 6, respectively. Since an operation of the second enhancement layer encoding unit 630 is similar to that of the first enhancement layer encoding unit 620, an operation of the enhancement layer encoding unit 860 for an enhancement layer having the concept including a first enhancement layer and a second enhancement layer will be described below in detail.

The base layer encoding unit 810 encodes a native-resolution image sequence for each native-resolution image. The enhancement layer encoding unit 860 receives a super-resolution image sequence and encodes the received super-resolution image sequence for each super-resolution image. According to an embodiment of the present invention, the native-resolution image sequence may be a 2K-resolution image sequence, and the super-resolution image sequence may be a 3K-resolution image sequence. Operations of the base layer encoding unit 810 and the enhancement layer encoding unit 860 will be described below.

First, the base layer encoding unit 810 will now be described.

A block division unit 818 of a base layer divides a base layer image into blocks of a predetermined size. As described above, instead of using a fixed size of a block, such as a macroblock, in the prior art, the scalable 3K-resolution image encoding system 800 according to an embodiment of the present invention may use encoding units of a tree structure, which are obtained by dividing an image based on a maximum encoding unit. Hereinafter, for convenience of description, an encoding unit is referred to as a block.

Intra or inter prediction on each block outputted from the block division unit 818 may be performed. A motion compensation unit 840 may output a prediction block of a current block by performing inter prediction on the current block, and an intra prediction unit 845 may output a prediction block of the current block by performing intra prediction on the current block.

An encoding control unit 815 determines a prediction mode to be used to acquire a prediction block that is most similar to the current block from among an intra prediction mode and an inter prediction mode and controls a prediction switch 848 to output a prediction block according to the determined prediction mode. A residual that is a difference value between the prediction block of the current block, which has been acquired through intra prediction or inter prediction, and the current block may be transformed and quantized by a transform/quantization unit 820, thereby outputting a quantized transform coefficient.

A scaling/inverse-transform unit 825 may restore the residual by scaling and inverse-transforming the quantized transform coefficient.

A storage 830 restores the current block by adding the restored residual to the prediction block of the current block and stores the restored current block. The above-described encoding process may be repeated for all blocks of the base layer image, which have been divided by the block division unit 818, and encoded and restored blocks of the base layer may be stored in the storage 830.

A deblocking unit 835 may perform deblocking filtering on the restored base layer image.

An up-sampling unit 855 up-samples the base layer image and outputs an up-sampled image corresponding to an enhancement layer image.

The up-sampling unit 855 according to an embodiment of the present invention may up-sample the base layer image by using an eight-tap filter in which different coefficients are respectively applied to sub-pixel positions. By using the eight-tap filter, non-integer up-sampling for interpolating the 2K-resolution base layer image to a first enhancement layer image may be implemented.

For example, FIG. 9 is a table of coefficients of an up-sampling filter used for up-sampling a scalable 3K-resolution image, according to an embodiment of the present invention. Referring to FIG. 9, a filter coefficient according to a sub-pixel position of the up-sampling filter may be one selected from a coefficient {0, 0, 0, 64, 0, 0, 0, 0} corresponding to a zeroth pixel position, a coefficient {0, 1, −3, 63, 4, −2, 1, 0} corresponding to a first pixel position, a coefficient {−1, 2, −5, 62, 8, −3, 1, 0} corresponding to a second pixel position, a coefficient {−1, 3, −8, 60, 13, −4, 1, 0} corresponding to a third pixel position, a coefficient {−1, 4, −10, 58, 17, −5, 1, 0} corresponding to a fourth pixel position, a coefficient {−1, 4, −11, 52, 26, −8, 3, −1, 0} corresponding to a fifth pixel position, a coefficient {−1, 4, −11, 50, 28, −8, 2, 0} corresponding to a sixth pixel position, a coefficient {−1, 4, −11, 44, 35, −10, 4, −1} corresponding to a seventh pixel position, and a coefficient {−1, 4, −11, 40, 40, −11, 4, −1} corresponding to an eighth pixel position.

Referring back to FIG. 8, the enhancement layer encoding unit 860 will now be described in detail.

A block division unit 868 of an enhancement layer divides an enhancement layer image into blocks of a predetermined size. Intra or inter prediction on each block outputted from the block division unit 868 may be performed. A motion compensation unit 890 may output a prediction block of a current block by performing inter prediction on the current block, and an intra prediction unit 895 may output a prediction block of the current block by performing intra prediction on the current block.

In particular, the intra prediction unit 895 of the enhancement layer, according to an embodiment of the present invention, performs intra prediction on the current block of the enhancement layer by selectively using neighboring pixels of an enhancement layer block acquired based on neighboring pixels of the current block of the enhancement layer, which has been encoded and restored before the current block of the enhancement layer, and neighboring pixels of a base layer block. An operation of performing intra prediction on a current block of an enhancement layer will be described below in detail.

An encoding control unit 865 determines a prediction mode to be used to acquire a prediction block that is most similar to the current block of the enhancement layer from among the intra prediction mode and the inter prediction mode and controls a prediction switch 898 to output a prediction block of the current block according to the determined prediction mode. A residual that is a difference value between the prediction block of the current block, which has been acquired through intra prediction or inter prediction, and the current block may be transformed and quantized by a transform/quantization unit 870, thereby outputting a quantized transform coefficient.

A scaling/inverse-transform unit 875 may restore the residual by scaling and inverse-transforming the quantized transform coefficient. A storage 880 restores the current block by adding the restored residual to the prediction block of the current block and stores the restored current block. A deblocking unit 885 may perform deblocking filtering on the restored enhancement layer image.

Similarly to the scalable 3K-resolution image encoding system 800 according to an inter-layer prediction method, a scalable 3K-resolution image decoding system may also be implemented. That is, the scalable 3K-resolution image decoding system may receive a base layer bitstream and an enhancement layer bitstream. A base layer decoding unit of the scalable 3K-resolution image decoding system may generate base layer-restored images by decoding the base layer bitstream. An enhancement layer decoding end of the scalable 3K-resolution image decoding system may generate super-resolution images by using encoding information of an image obtained by up-sampling a base layer restored image through the above-described up-sampling filter and encoding information restored by decoding the enhancement layer bitstream.

The scalable 3K-resolution image encoding system 800 according to an embodiment of the present invention may be included in the content server (refer to 50 of FIG. 5A), and the content server (refer to 50 of FIG. 5A) may output a layer stream to be transmitted to the mobile terminal (refer to 10 of FIG. 1A).

In addition, the scalable 3K-resolution image decoding system according to an embodiment of the present invention may be included in the mobile terminal (refer to 10 of FIG. 1A), and the mobile terminal (refer to 10 of FIG. 1A) may receive a layer stream to which SVC has been applied and generate a 3K-resolution image.

Figure 10:
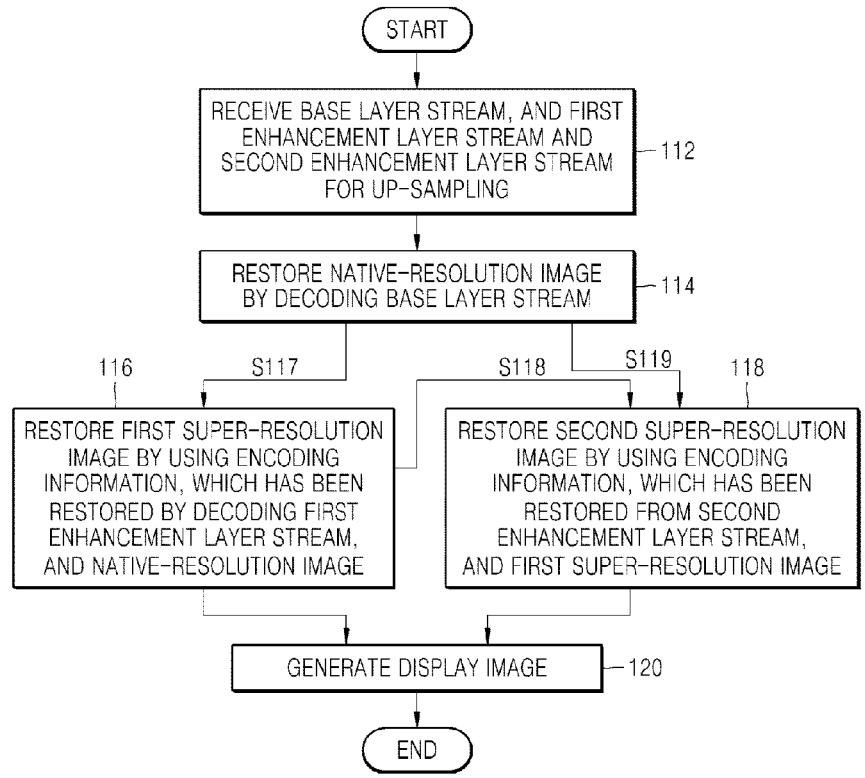
FIG. 10 is a flowchart of a method of generating a scalable 3K-resolution image, according to an embodiment of the present invention.

FIG. 10 is a flowchart of a method of generating a scalable 3K-resolution image, according to an embodiment of the present invention.

Referring to FIG. 10, the method of generating a scalable 3K-resolution image includes operations that are sequentially processed by the mobile terminal 10 for generating a 3K-resolution image and the content server 50 for generating a 3K-resolution image, which are respectively shown in FIGS. 1A and 5A. Therefore, although omitted hereinafter, the description of the mobile terminal 10 and the content server 50 with respect to FIGS. 1A and 5A is also applied to the method shown in FIG. 10. Therefore, although an operation of the mobile terminal 10 for generating a 3K-resolution image is described with reference to FIG. 10, it will be easily understood by those of ordinary skill in the art that the same operation sequence may also be performed by the content server 50 for generating a 3K-resolution image.

Referring to FIG. 10, in operation 112, the mobile terminal 10 according to an embodiment of the present invention receives a base layer stream, a first enhancement layer stream, and a second enhancement layer stream.

In operation 114, the mobile terminal 10 according to an embodiment of the present invention restores a native-resolution image by decoding the base layer stream. For example, a 2K-resolution image may be restored. A detailed decoding operation has been described and thus is omitted.

In operation 116, the mobile terminal 10 according to an embodiment of the present invention restores a first super-resolution image by using encoding information, which has been restored by decoding the first enhancement layer stream, and the native-resolution image.

The mobile terminal 10 according to an embodiment of the present invention may up-sample the native-resolution image by using an up-sampling filter and restore the first super-resolution image by using the up-sampled native-resolution image and the encoding information, which has been restored from the first enhancement layer stream.

For example, a 3K-resolution image may be restored by using an image, which is obtained by up-sampling the 2K-resolution image, and the encoding information, which has been restored by decoding the first enhancement layer stream.

The up-sampling filter according to an embodiment of the present invention may be determined as one of filters respectively having different coefficients according to eight sub-pixel positions.

In operation S117, when a display image to be generated by the mobile terminal 10 is the first super-resolution image, the display image is generated by using the generated first super-resolution image in operation 120.

In operation S118, when the display image to be generated by the mobile terminal 10 is a second super-resolution image, the mobile terminal 10 proceeds to operation 118.

In operation 118, the mobile terminal 10 according to an embodiment of the present invention restores a second super-resolution image by using encoding information, which has been restored from the second enhancement layer stream, and the first super-resolution image. For example, a 4K-resolution image may be restored by using an image, which is obtained by up-sampling the 3K-resolution image, and the encoding information, which has been restored from the second enhancement layer stream.

The present embodiment is not necessarily limited to the above description, and as in operation S119, the mobile terminal 10 may restore the second super-resolution image by using the restored native-resolution image instead of the first super-resolution image. In addition, by applying similar methods, a third super-resolution image and a fourth super-resolution image may be restored.

In operation 120, the mobile terminal 10 according to an embodiment of the present invention generates a display image by using the generated second super-resolution image.

As described above, when a 2K-resolution image is restored to a 4K-resolution image through two stages by applying an up-sampling filter twice, a more ideal gain may be obtained than a case where the 2K-resolution image is directly restored to a 4K-resolution image.

Figure 11:
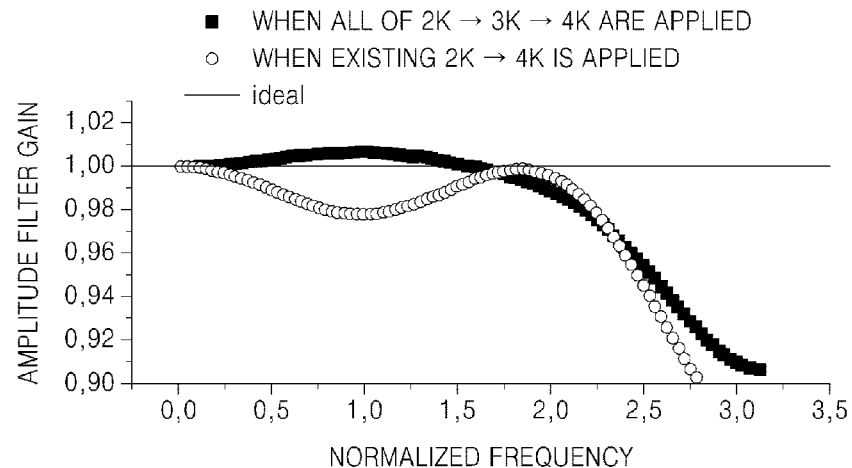
FIG. 11 is a filter gain graph when a filter for up-sampling is applied to an image to which scalable video coding has been applied, according to an embodiment of the present invention.

For example, FIG. 11 is a filter gain graph when a filter for up-sampling is applied to an image to which SVC has been applied, according to an embodiment of the present invention.

Referring to FIG. 11, as described above, when a 3K-resolution image is restored by using a 2K-resolution image through a filter having a predetermined coefficient and a 4K-resolution image is restored by using the restored 3K-resolution image, an ideal graph of which a filter gain is close to 1 appears. However, when a 2K-resolution image is directly restored to a 4K-resolution image by an existing method, a portion where a filter gain is lower than 1 between frequency values of 0.5 and 1.5 exists, and thus, the performance is relatively degraded.

Therefore, when a 4K-resolution image is generated from a 2K-resolution image, a relatively ideal gain may be obtained by restoring a 3K-resolution image from a 2K-resolution image and restoring a 4K-resolution image from the restored 3K-resolution image, according to an embodiment of the present invention.

The output unit 57 of the content server 50 according to an embodiment of the present invention, which has been described in detail with reference to FIG. 5A, may transmit a base layer stream and an enhancement layer stream in a DASH transport format. An MPD header of the DASH transport format may include a flag 1201 indicating a resolution conversion method, an up-sampling filter coefficient 1203, and mobile terminal model information 1202. Therefore, the content server 50 may transmit a scalable 3K-resolution image stream to which an up-sampling method has been differently applied to the mobile terminal 10.

Figure 12:
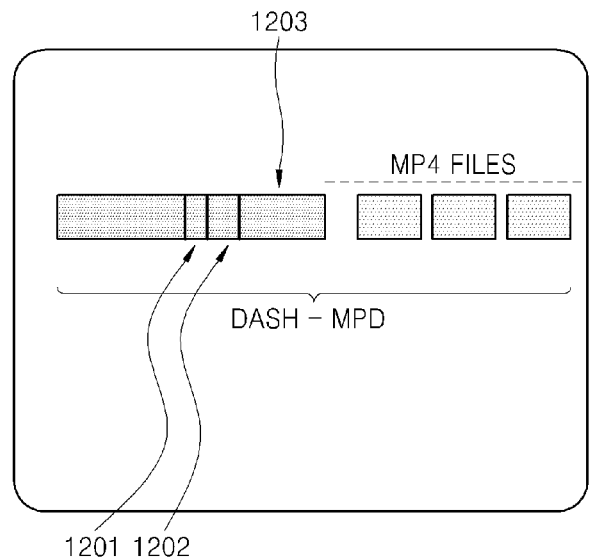
FIG. 12 illustrates a DASH transport format including a flag, according to an embodiment of the present invention.

For example, FIG. 12 illustrates a DASH transport format including a flag, according to an embodiment of the present invention.

Referring to FIG. 12, an MPD header of an image stream in the DASH transport format may include the flag 1201 indicating a resolution conversion method, the mobile terminal model information 1202, and the up-sampling filter coefficient 1203 to be used when two-stage up-sampling on a native-resolution image is performed.

The content server 50 according to an embodiment of the present invention may insert the mobile terminal model information 1202 and the up-sampling filter coefficient 1203 into the MPD header and transmit the MPD header.

Alternatively, the content server 50 according to another embodiment of the present invention may transmit different data depending on a value of the flag 1201. For example, when the value of the flag 1201 is 1, a stream encoded under standard SVC may be transmitted. In addition, the mobile terminal model information 1202 for implementing in an optimal resolution may be provided together with the encoded stream. Therefore, the mobile terminal 10 may select a resolution to be restored according to the performance of the mobile terminal 10, and thus, an image of differentiated image quality, such as a 2K, 3K, or 4K resolution, may be reproduced according to the performance of the mobile terminal 10.

Otherwise, when the value of the flag 1201 is 0, a coefficient value of an up-sampling filter to be used when optimized two-stage up-sampling is performed may be transmitted.

According to an embodiment of the present invention, a data stream transmitted by the content server 50 in a DASH transport format including an MPD header may be received by the mobile terminal 10. Therefore, the mobile terminal 10 may restore a 3K-resolution image by applying a different up-sampling method according to the flag 1201.

Figure 13:
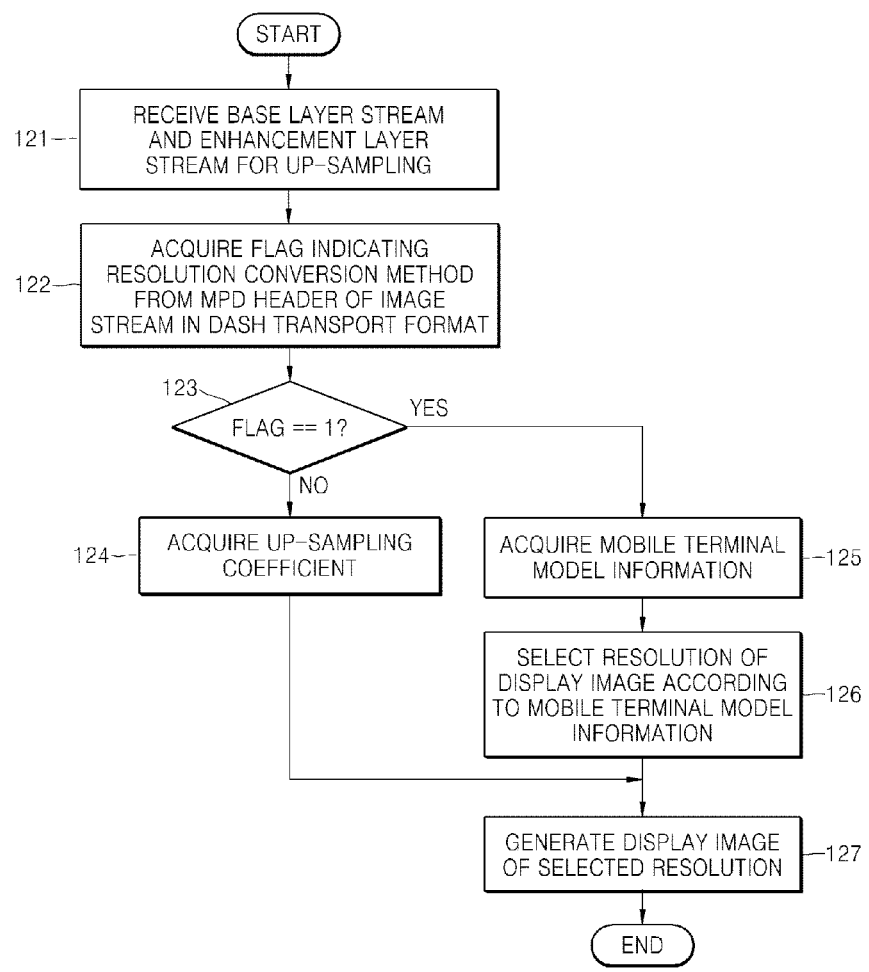
FIG. 13 is a flowchart of a method of restoring a 3K-resolution image, to which a different up-sampling method is applied according to a flag, in the mobile terminal, according to an embodiment of the present invention.

FIG. 13 is a flowchart of a method of restoring a 3K-resolution image, to which a different up-sampling method is applied according to a flag, in the mobile terminal 10, according to an embodiment of the present invention.

In operation 121, the mobile terminal 10 according to an embodiment of the present invention receives a base layer stream and an enhancement layer stream for up-sampling.

In operation 122, the mobile terminal 10 according to an embodiment of the present invention acquires a flag indicating a resolution conversion method from an MPD header of the image stream (the base layer stream and/or the enhancement layer stream) in a DASH transport format.

The mobile terminal 10 according to an embodiment of the present invention may acquire mobile terminal model information and an up-sampling filter coefficient to be used when two-stage up-sampling on a native-resolution image is performed, according to the acquired flag.

First, in operation 123, the mobile terminal 10 determines whether a value of the flag is 1.

If the value of the flag is 0, the mobile terminal 10 acquires the up-sampling filter coefficient from the MPD header in operation 124.

In operation 127, the mobile terminal 10 according to an embodiment of the present invention up-samples a restored native-resolution image by using an up-sampling filter to which the acquire coefficient has been applied. Thereafter, a super-resolution image is restored by using the up-sampled native-resolution image and encoding information restored from the enhancement layer stream.

Otherwise, if it is determined in operation 123 that the value of the flag is 1, the mobile terminal 10 acquires the mobile terminal model information from the MPD header in operation 125.

In operation 126, the mobile terminal 10 selects a resolution of a display image according to the mobile terminal model information. The mobile terminal model information according to an embodiment of the present invention may include a mobile terminal model name that is most suitable for each image of a resolution which is restorable from a transmitted image stream. Alternatively, the mobile terminal model information may include optimal resolution information of an image to be reproduced for each mobile terminal model. Therefore, the mobile terminal 10 may restore the received image as one selected from 2K, 3K, and 4K resolutions based on the received mobile terminal model information and a current terminal model name.

In operation 127, the mobile terminal 10 according to an embodiment of the present invention generates an image to be displayed on a mobile terminal screen by restoring the image of the selected resolution.

As described above, the content server 50 according to an embodiment of the present invention may transmit an up-sampling coefficient and mobile terminal model information by inserting a flag into an MPD header. In addition, the mobile terminal 10 may receive the up-sampling coefficient and the mobile terminal model information and generate an image having an optimal resolution according to a mobile terminal model.

The output unit 57 of the content server 50 according to an embodiment of the present invention may transmit information on a reproduction variable. For example, the image generation unit 55 of the content server 50 may generate a plurality of enhancement layer streams having various brightnesses or senses of color according to the reproduction variable when an enhancement layer stream is generated. Therefore, the output unit 57) may transmit the plurality of enhancement layer streams and information on the reproduction variable used for each enhancement layer stream to the mobile terminal 10.

Therefore, a signal to noise ratio (SNR) scalable image restoration device 1400 for receiving the reproduction variable and performing restoration, according to an embodiment of the present invention, will now be described. It will be easily understood by those of ordinary skill in the art that the SNR scalable image restoration device 1400 may be included in the mobile terminal 10 described above with reference to FIG. 1A.

Figure 14:
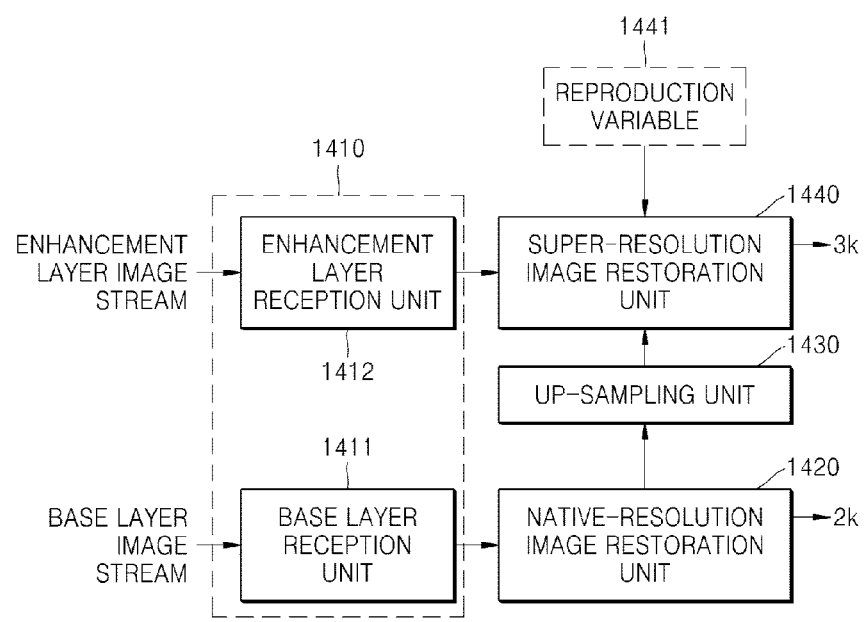
FIG. 14 is a block diagram of a signal to noise ratio (SNR) scalable image restoration device according to an embodiment of the present invention.

FIG. 14 is a block diagram of the SNR scalable image restoration device 1400 according to an embodiment of the present invention.

Referring to FIG. 14, the SNR scalable image restoration device 1400 according to an embodiment of the present invention may include a reception unit 1410, a native-resolution image restoration unit 1420, an up-sampling unit 1430, and a super-resolution image restoration unit 1440. In addition, the reception unit 1410 may include a base layer reception unit 1411 for receiving a layer stream of each layer and an enhancement layer reception unit 1412.

Since operations of the reception unit 1410, the native-resolution image restoration unit 1420, the up-sampling unit 1430, and the super-resolution image restoration unit 1440 of FIG. 14 are similar to those of the reception unit 710, the native-resolution image restoration unit 720, the first up-sampling unit 730, and the first super-resolution image restoration unit 740 of FIG. 7, only the difference, which is the reception unit 1410 and the super-resolution image restoration unit 1440, will be described in detail.

The SNR scalable image restoration device 1400 according to an embodiment of the present invention may receive information on a reproduction variable 1441. The reproduction variable 1441 may be data, such as a sense of color, brightness, and the like of an image to be displayed, which may be variably set by a user. In addition, the information on the reproduction variable 1441 may include quantization data (a QP) to be used to selectively restore a super-resolution image having various brightnesses and senses of color from an enhancement layer stream.

The reception unit 1410 according to an embodiment of the present invention may receive a base layer stream, an enhancement layer stream for up-sampling, and information on the reproduction variable 1441 for SNR scalable image restoration.

The native-resolution image restoration unit 1420 according to an embodiment of the present invention may restore a native-resolution image by decoding the base layer stream.

The super-resolution image restoration unit 1440 according to an embodiment of the present invention may restore an SNR-scaled super-resolution image by using the collected reproduction variable 1441, encoding information restored from the enhancement layer stream, and data obtained by up-sampling the restored native-resolution image.

The SNR-scaled super-resolution image indicates a super-resolution image in which various brightnesses and senses of color have been implemented by setting the reproduction variable 1441 desired for each encoding layer. For example, the reproduction variable 1441 may be data for indicating an optimal variable brightness and sense of color of the SNR-scaled super-resolution image.

The SNR scalable image restoration device 1400 according to an embodiment of the present invention may decode the enhancement layer stream by using a QP value, a sense of color, brightness, or the like as the reproduction variable 1441.

The SNR scalable image restoration device 1400 according to another embodiment of the present invention may selectively reproduce an image having various senses of color, brightnesses, and the like depending on the mobile terminal performance or the preference of a user by receiving a plurality of enhancement layer streams generated so as to have various brightnesses or senses of color according to the reproduction variable 1441 and applying the reproduction variable 1441 to the received plurality of enhancement layer streams.

The embodiments of the present invention can be written as computer programs and can be implemented in general-use digital computers that execute the programs using a computer-readable recording medium. Examples of the computer-readable recording medium include storage media, such as magnetic storage media (e.g., ROM, floppy disks, hard disks, etc.) and optical recording media (e.g., CD-ROMs, or DVDs).

In addition, other embodiments of the present invention can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer-readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A method of generating a 3K-resolution display image for a mobile terminal screen, the method comprising:
   receiving an input image;
   selecting a 3K resolution as a resolution of an image to be reproduced on the mobile terminal screen of a predetermined size, based on human cognitive characteristics and resolution analytical ability with respect to the mobile terminal screen; and
   generating a display image having the selected 3K resolution by using the input image,
   wherein the receiving of the input image comprises receiving a base layer stream and an enhancement layer stream,
   wherein the generating of the display image comprises:
      restoring a native-resolution image by decoding the base layer stream;
      restoring a super-resolution image by using encoding information decoded from the enhancement layer stream and the native-resolution image; and
      generating the display image by using the restored super-resolution image, and
   wherein the receiving of the input image comprises acquiring a flag indicating a resolution conversion method from a media presentation description (MPD) header of an image stream of a dynamic adaptive streaming over hypertext transfer protocol (DASH) transport format.

2. The method of claim 1, wherein the generating of the display image comprises:
   up-sampling the native-resolution image by using an up-sampling filter; and
   restoring a super-resolution image by using encoding information decoded from the enhancement layer stream and the up-sampled native-resolution image.

3. The method of claim 2, wherein the up-sampling of the native-resolution image comprises selecting the up-sampling filter configured with a different coefficient for each of sub-pixel positions.

4. The method of claim 3, wherein the selecting of the up-sampling filter comprises selecting one of eight-tap filters configured with a coefficient $\{0, 0, 0, 64, 0, 0, 0, 0\}$ corresponding to a zeroth pixel position, a coefficient $\{0, 1, -3, 63, 4, -2, 1, 0\}$ corresponding to a first pixel position, a coefficient $\{-1, 2, -5, 62, 8, -3, 1, 0\}$ corresponding to a second pixel position, a coefficient $\{-1, 3, -8, 60, 13, -4, 1, 0\}$ corresponding to a third pixel position, a coefficient $\{-1, 4, -10, 58, 17, -5, 1, 0\}$ corresponding to a fourth pixel position, a coefficient $\{-1, 4, -11, 52, 26, -8, 3, -1, 0\}$ corresponding to a fifth pixel position, a coefficient $\{-1, 4, -11, 50, 28, -8, 2, 0\}$ corresponding to a sixth pixel position, a coefficient $\{-1, 4, -11, 44, 35, -10, 4, -1\}$ corresponding to a seventh pixel position, and a coefficient $\{-1, 4, -11, 40, 40, -11, 4, -1\}$ corresponding to an eighth pixel position.

5. The method of claim 1, wherein the receiving of the input image comprises acquiring mobile terminal model information based on a value of the flag.

6. The method of claim 5, wherein the selecting of the 3K resolution comprises selecting a resolution of an image to be reproduced on the mobile terminal screen based on the acquired mobile terminal model information, and
   the generating of the display image comprises selectively decoding the base layer stream and the enhancement layer stream based on the selected resolution.

7. The method of claim 1, wherein the receiving of the input image comprises receiving an enhancement layer stream encoded to a plurality of layers depending on a reproduction variable, and
   the restoring of the super-resolution image comprises restoring the super-resolution image by using encoding information decoded from the enhancement layer stream, the reproduction variable, and the native-resolution image.

8. A non-transitory computer-readable storage medium having stored therein program instructions, which when executed by a computer, perform the method of claim 1.

9. An apparatus for generating a 3K-resolution display image for a mobile terminal screen, the apparatus comprising:
   an image reception unit for receiving an input image;
   an image resolution selection unit for selecting a 3K resolution as a resolution of an image to be reproduced on the mobile terminal screen of a predetermined size, based on human cognitive characteristics and resolution analytical ability with respect to the mobile terminal screen; and an image generation unit for generating a display image having the selected 3K resolution by using the input image, wherein the image reception unit comprises:

a base layer reception unit for receiving a base layer stream; and an enhancement layer reception unit for receiving an enhancement layer stream, and wherein the image generation unit further comprises:

a native-resolution image restoration unit for restoring a native-resolution image by decoding the base layer stream; and a super-resolution image restoration unit for restoring a super-resolution image by using encoding information decoded from the enhancement layer stream and the native-resolution image, wherein the image generation unit generates the display image having the selected 3K resolution by using the restored super-resolution image, and wherein the image reception unit acquires a flag indicating a resolution conversion method from a media presentation description (MPD) header of an image stream of a dynamic adaptive streaming over hypertext transfer protocol (DASH) transport format.

10. The apparatus of claim 9, wherein the image generation unit comprises an image interpolation unit for generating a super-resolution image by performing non-integer interpolation on the input image.

11. The apparatus of claim 9, wherein the image reception unit receives an enhancement layer stream encoded to a plurality of layers depending on a reproduction variable, and the image generation unit restores the super-resolution image by using encoding information decoded from the enhancement layer stream, the reproduction variable, and the native-resolution image.

\* \* \* \* \*